United States Patent
Barrese et al.

(10) Patent No.: US 6,612,352 B1
(45) Date of Patent: Sep. 2, 2003

(54) TIRE FOR MOTOR VEHICLE WHEELS HAVING A SURFACE-WORKED ANNULAR SURFACE AT THE SIDEWALLS THEREOF

(75) Inventors: Antonio Barrese, Milan (IT); Massimo Battaini, Tradate (IT)

(73) Assignee: Pirelli Coordinamento Pneumatici S.p.A., Milan (IT)

( * ) Notice: Subject to any disclaimer, the term of this patent is extended or adjusted under 35 U.S.C. 154(b) by 0 days.

(21) Appl. No.: 09/478,803

(22) Filed: Jan. 7, 2000

Related U.S. Application Data (63) Continuation of application No. 08/933,322, filed on Sep. 18, 1997, now Pat. No. 6,032,711, which is a division of application No. 08/585,745, filed on Jan. 16, 1996, now Pat. No. 5,728,242, which is a continuation of application No. 08/197,494, filed on Feb. 16, 1994, now abandoned.

(30) Foreign Application Priority Data

Feb. 16, 1993 (IT) ............................... MI93A0280

(51) Int. Cl.[7] ......................... B60C 13/02; B60C 13/04
(52) U.S. Cl. ........................... 152/523; 152/524
(58) Field of Search ................ 152/523, 524, 152/153, DIG. 12; D12/605

(56) References Cited

U.S. PATENT DOCUMENTS

| 1,462,984 A | * | 7/1923 | Schenuit | 152/153 |
|---|---|---|---|---|
| D87,418 S | | 7/1932 | Smith | |
| 4,343,342 A | | 8/1982 | McDonald | |
| 4,823,856 A | | 4/1989 | Roberts | |
| 5,303,758 A | * | 4/1994 | Clementz et al. | 152/523 |
| D373,751 S | * | 9/1996 | Barrese | D12/605 |

FOREIGN PATENT DOCUMENTS

| FR | 2412426 | 7/1979 |
|---|---|---|
| FR | 2661871 | 11/1991 |
| GB | 2008062 | 5/1979 |
| GB | 2010755 | 7/1979 |

* cited by examiner

Primary Examiner—Adrienne C. Johnstone
(74) Attorney, Agent, or Firm—Stevens, Davis, Miller & Mosher, LLP (57) ABSTRACT

A tire (1) having sidewalls (3) with an annular strip (8) within which a plurality of ribs (9) is formed. The ribs are disposed in mutual side by side relation and circumferentially distributed. The annular strip (8) is made in the form of a hollow on a sidewall (3) of the tire (1) and is designed to display informative inscriptions (12) the characters of which (13) are defined by projections (19) projecting from the surface of the annular strip.

17 Claims, 6 Drawing Sheets

TIRE FOR MOTOR VEHICLE WHEELS HAVING A SURFACE-WORKED ANNULAR SURFACE AT THE SIDEWALLS THEREOF

This application is a continuation of U.S. patent application Ser. No. 08/933,322, filed Sep. 18, 1997 now U.S. Pat. No. 6,032,711, which is a divisional of U.S. patent application Ser. No. 08/585,745, filed Jan. 16, 1996 now U.S. Pat. No. 5,728,242, which is a Rule 62 continuation of U.S. patent application Ser. No. 08/197,494, filed Feb. 16, 1994.

BACKGROUND OF THE INVENTION

The present invention relates to a tire for use on motor vehicle wheels, of the type comprising: a pair of beads each of which defines an inner circumferential edge of the tire; a pair of sidewalls, each of which is in the form of an annulus and extends in a radial direction away from one of said beads; a tread band of substantially cylindrical conformation the outer peripheral edges of the sidewalls at respective buttress areas, said tread band having a patterned annular surface at its junction with the sidewalls.

It is known that tires presently used in the automotive field have a tread band in the form of a cylindrical surface arranged to contact the roadway, two sidewalls extending in a radial direction from the opposite edges of the tread band and two beads defined at the radial inner end of the respective sidewalls along the inner circumferential edges of the tire. In known tires, the sidewalls have a substantially smooth surface on which different inscriptions such as the brand of the tire-producing company, model, particular technical data and other information, are printed.

The above inscriptions sometimes encounter some readability problems in that the contrast between the inscription surface and background surface, that is the remaining surface of the tire sidewall, is not very strong and in that the incident light on the tire sidewall, except in very favorable lighting conditions, creates two opposed circular sectors which are well-lighted but of very reduced width, whereas all the remaining portion of the sidewall is left in the shade, so that only a small part of said inscriptions is highlighted.

As regards contrast, solutions tending to enhance it have been long since adopted, such as writing the inscriptions in relief with respect to the background, knurling the inscription surface or emphasizing the edges of said inscriptions with respect to the central part thereof. These expedients have only partly solved the problem related to the inscription readability, but without dealing with the aspect connected with the tire sidewall lighting.

It must also be noted that in the tire vulcanization process carried out in a closed mold, it is required that the air that has been trapped between the mold cheek and the tire sidewall should be vented during the mold closure; in order to enable this air escape, the solutions of the known art make it necessary to form a great number of small holes on the mold cheeks which holes not only require frequent and difficult mold cleaning operations, but also give rise to the presence, on the finished workpiece, of hair-like projections consisting of the vulcanization stems created by the elastomeric material which penetrates into the small holes during the vulcanization step. These unaesthetic hair-like projections must be eliminated by carrying out a finishing operation on the vulcanized tire.

In addition to the above, a correct and optimal distribution of these small holes on the mold cheek for air escape purposes would inevitably involve the presence of some small holes on the inscriptions as well or in close proximity thereto: but since the relative hair-like projections would aesthetically impair these inscriptions to a great degree, it is better to form a greater number of small holes, provided that they are far from the inscriptions.

From the U.S. Des. Pat. No. 87,418 a tire for motor vehicles is known which has the sidewalls devoid of informative inscriptions and a rounded-profile tread. Two series of grooves depart from the tread center line of said tire and they symmetrically extend on the opposite sidewalls of the tire up to the bead area.

In this tire the problem related to the sidewall hair-like projections seems to be overcome by renouncing the inscriptions and through a plurality of grooves extending radially from the bead to the buttress and circumferentially distributed on the tire sidewall, which grooves constitute the prolongation of the tread pattern grooves. Since these grooves ensure air escape towards the tread, they make it useless to provide small venting holes on the mold cheeks.

In accordance with the present invention, the Applicant has found that by defining at the tire sidewalls an annular strip having a plurality of circumferentially distributed ribs crossing the annular strip itself, it is possible to affix informative inscriptions on the surface of said strip, the readability of which is greatly improved while at the same time achieving a better luminosity of the whole tire sidewall and important advantages from the production point of view.

SUMMARY OF THE INVENTION

In greater detail, the present invention relates to a tire for use on motor vehicle wheels comprising a pair of beads each of which defines an inner circumferential edge of the tire, a pair of sidewalls, each of which is in the form of an annulus and extends in the radial direction and away from one of said beads and a tread band of substantially cylindrical conformation the axially opposite edges of which are joined to the sidewalls at respective buttress areas. On the outer surface of at least one of said sidewalls a surface patterned annular strip is located, the radial extension of which is defined between an inner peripheral edge disposed in the area included between the relative bead and the maximum width circumferential line of the tire, and an outer peripheral edge substantially coincident with the edge of the tread band at the corresponding buttress area. On said annular strip a plurality of ribs are formed which are disposed consecutively in side by side relation, are circumferentially distributed and extend each substantially according to a direction intersecting at least the outer periphery edge of said annular strip.

Advantageously informative inscriptions are formed on the annular strip in a unitary manner.

In accordance with the invention, the annular strip is formed on the corresponding tire sidewall in the form of a surface hollow of predetermined depth, said ribs having a height lower than said depth.

Preferentially, the height of said ribs is not lower than half the depth of said surface hollow.

According to a preferred choice, said informative inscriptions are defined by a plurality of projections emerging from said annular strip according to a height greater than that of said ribs and, preferably, greater than the depth of said surface hollow.

In accordance with a further aspect of the invention, each of said ribs has a trapezoidal-shaped profile and a substantially rectilinear extension.

In greater detail, each of said ribs extends from the inner peripheral edge to the outer peripheral edge according to a given angle of inclination with respect to a radial straight line issuing from the inner peripheral edge at the crossing point with the rib itself, each rib being spaced apart from the adjacent rib according to an arc that on the inner peripheral edge subtends a respective central angle of predetermined opening.

In one embodiment said angle of inclination, identical for wall ribs, is generally included between 60° and 90° and, preferentially, lower than 85°. In said embodiment, the arc and the central angle are identical for all pairs of adjacent ribs. In particular the arc has an amplitude included between 0.8 mm and 5 mm whereas the central angle has an opening included between 0.0178° and 1.35°.

According to a second embodiment of the tire of the invention, a plurality of sectors of an annulus having the same angular extension is defined along the circumferential extension of said annular strip, each of them having, along the circumferential extension thereof, a gradual increase of the angle of inclination of the individual ribs, together with a gradual increase of the values of said arc and central angle.

Preferably, the annular strip has two or four of said sectors of an annulus.

In greater detail, in each of said sectors the value of said angle of inclination increases continuously from 0° to 90° while at the same time the value of said arc increases continuously from 0.8 mm to 5 mm and likewise the value of said central angle increases continuously from 0.0178° to 1.35°.

According to a further embodiment of the invention, the annular strip has a predetermined number of sectors of an annulus having the same annular extension, preferably substantially equal to 180°, each of said sectors having first and second series of ribs extending from the inner peripheral edge and the outer peripheral edge respectively, each rib of the first series intersecting a corresponding rib of the second series at a respective point of mutual break.

In more detail, each rib of the first series is inclined in the opposite way to that of the corresponding rib of the second series with respect to a radial direction passing through the respective point of mutual break. Preferentially, said points of mutual break are consecutively aligned according to a spiral-shaped line extending from the inner peripheral edge to the outer peripheral edge.

Finally, the number of said ribs present in said annular strip are preferably greater than 200.

BRIEF DESCRIPTION OF THE DRAWINGS

Further features and advantages will become more apparent from the detailed description of some preferred embodiments of a tire for motor vehicles having a surface patterned annular strip at the sidewalls, according to the present invention. This description is given hereinafter by way of non-limiting example with reference to the accompanying drawings, in which.

Referring to the drawings, a motor vehicle tire having a surface patterned annular strip at the sidewalls in accordance with the present invention has been generally identified by reference numeral 1.

Figure 1:
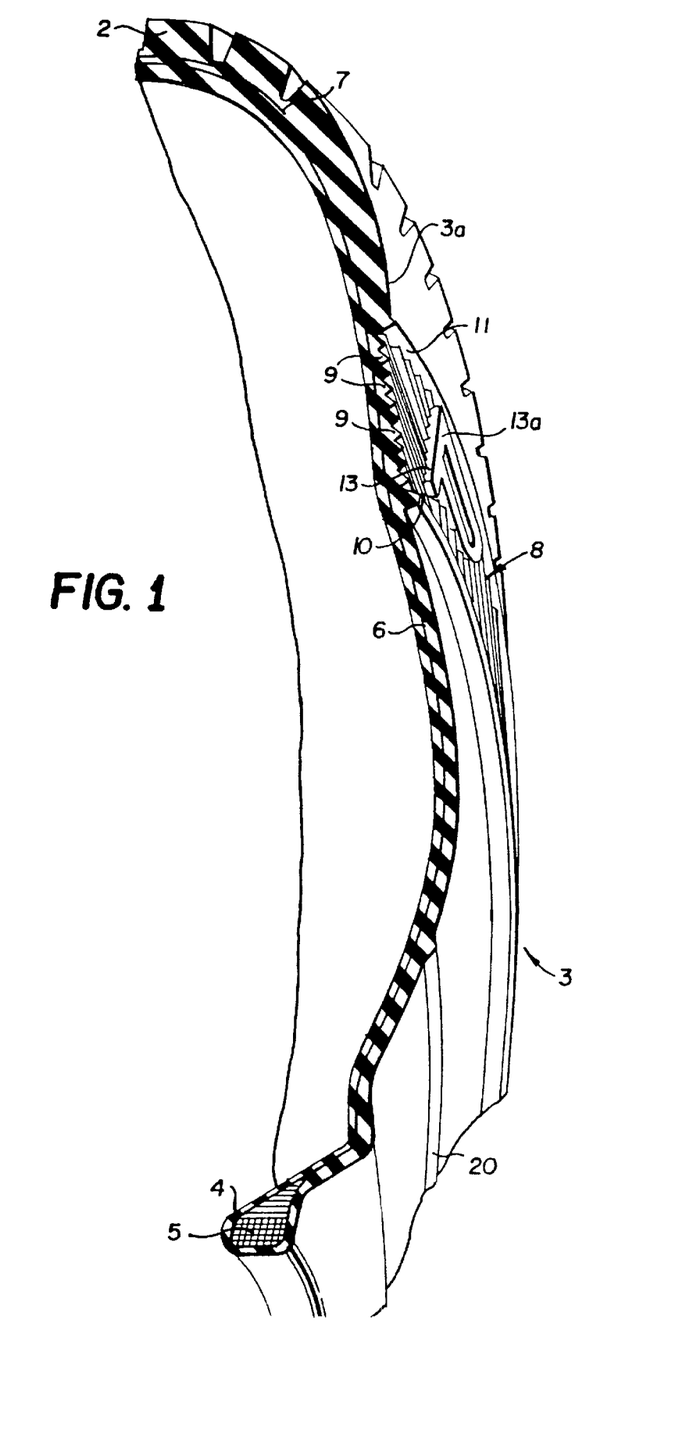
FIG. 1 is a fragmentary perspective view, sectioned along a meridian plane, of a sidewall of a tire provided with a surface patterned annular strip according to the present invention.

As is known the tire 1 has a tread band 2 of substantially cylindrical conformation as well as two sidewalls 3 (only one of which is shown) in the form of an annulus extending in a substantially radial direction from the opposite edges of the tread band 2 towards the tire axis of rotation.

Each of said sidewalls 3 has at its radial inner end a corresponding bead 4 defined along the inner circumferential edge of the tire 1. At the beads 4 the tire 1 is engaged on a rim (not shown) for defining a vehicle wheel.

At each of the beads 4, the tire 1 has a corresponding bead core 5 adapted to locally stiffen the area at which the tire is engaged to the rim and around which the opposite edges of one or more carcass plies 6 are wrapped, which plies extend over the whole section of the tire. If the tire 1 is of the radial type it is also provided with a circumferentially inextensible belt 7 disposed between the tread band 2 and carcass plies 6.

As regards the tread band, it is provided, as known, with a raised pattern having ridges and/or plugs bounded by grooves and involving lamellae variously combined with each other so as to ensure the necessary behavioral qualities of the tire in use, in particular road grip and resistance to aquaplaning.

It is pointed out that "tire for operating use on motor vehicle wheels" is intended to mean a new or remolded tire in which the grooves of said raised pattern have a depth not lower than 2 mm which is the minimum permissible value and considered capable of ensuring a sufficient level of performance.

In accordance with the present invention, an annular strip 8 is advantageously defined on the outer surface of at least one of the tire sidewalls 3, on which strip a plurality of ribs 9 is formed, preferably more than 200 ribs are disposed consecutively in side by side relation and circumferentially distributed. In greater detail, this annular strip has a radial extension defined between an outer peripheral edge 11 substantially coincident with the peripheral edge of the tread band 2 at the buttress area 3a of the sidewall 3, and an inner peripheral edge 10 positioned within the area included between the circumferential line of maximum axial width of the tire and the corresponding bead; preferentially, this edge coincides with the centering stringcourse 20 located close to the bead 4 and defines the contact area between the tire bead and the mounting rim with a safety zone.

Figure 6:
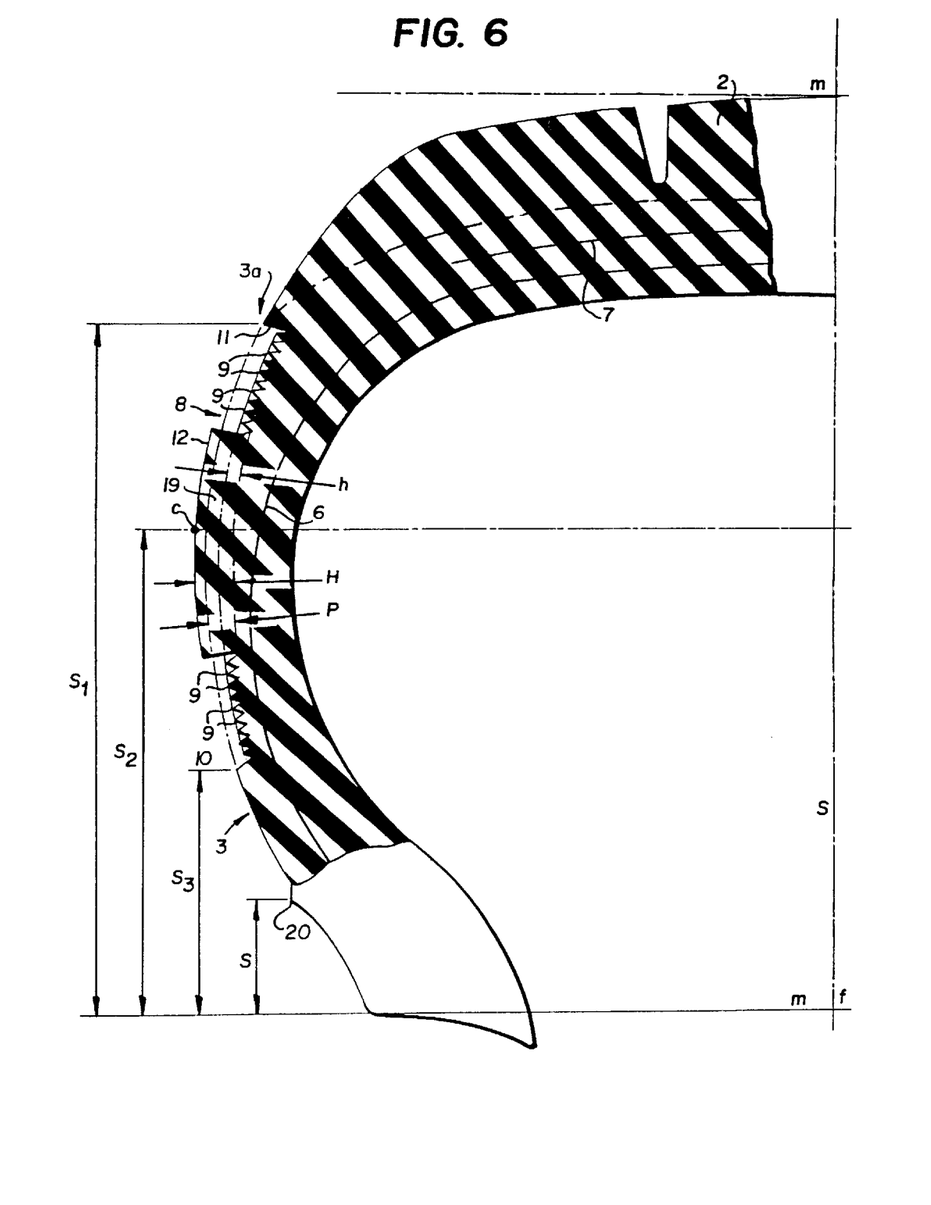
FIG. 6 is an enlarged sectional view of a tire sidewall taken along the line VI—VI in FIG. 2.

In other words, referring particularly to FIG. 6, being identified by "S" (capital letter) the section height of the tire measured at the mid-circumferential plane m—m starting from the reference line "f" at the beads, the outer peripheral edge 11 of said tread band is in the radially external center line of the tire sidewall, at a height "$S_1$" of a value usually corresponding to 70% of S or even more, whereas the inner peripheral edge 10 is in the radially internal center line of the tire sidewall, at an area included between the circumferential line of maximum axial width of the tire represented by the intersection point C between said line and the plane of the right section of the tire (which point is at a height "$S_2$" usually included between 40% and 60% of "S"), and the bead itself (line "f"); Preferably, the height "$S_3$" of the inner peripheral edge 10 will be included between 10% and 35% of "S" and more preferably will coincide with the height "s" (lower case letter) of said centering stringcourse.

By way of example only, in a prototype tire size 175/70 R 13 where S corresponds to 126 mm, $S_1$, $S_2$ and $S_3$ measure 94 mm (74%), 60 mm (48%) and 38 mm (30%), respectively.

Each of the ribs 9 has a wedge-shaped or trapezoidal-shaped (of easier manufacture) profile seen in right section, and extends substantially rectilinearly in a direction intersecting the outer peripheral edge 11 and can also intersect the inner peripheral edge 10 of said annular strip 8.

It is pointed out that the presence of ribs 9 in the annular strip 8 defines a surface reflecting the incident light on the tire sidewall 3 according to a reflection arc of greatly wider amplitude than in the case of a smooth surface.

This quality is advantageously utilized for optimizing the readability of informative inscriptions 12 put on the tire sidewall. In fact, in accordance with the present invention, these informative inscriptions 12 are made by characters 13 printed at the annular strip 8 in a unitary manner during the vulcanization of the tire 1, using the same elastomeric material forming the sidewall 3. These characters having smooth surfaces 13a are optically differentiated from the surface defined by the ribs 9, by effect of a different reflection of the incident light.

Therefore the readability of the informative inscriptions 12 printed on the annular strip 8 is greatly improved as compared to the readability of the same inscriptions printed, in accordance with the traditional known art, on a smooth-surface sidewall or a smooth area of the sidewall itself. In order to optimize the effect described above in short, the applicant has developed several preferred embodiments to be described in detail hereinafter, in which the ribs 9 are disposed within the annular strip according to different distribution modalities.

Figure 2:
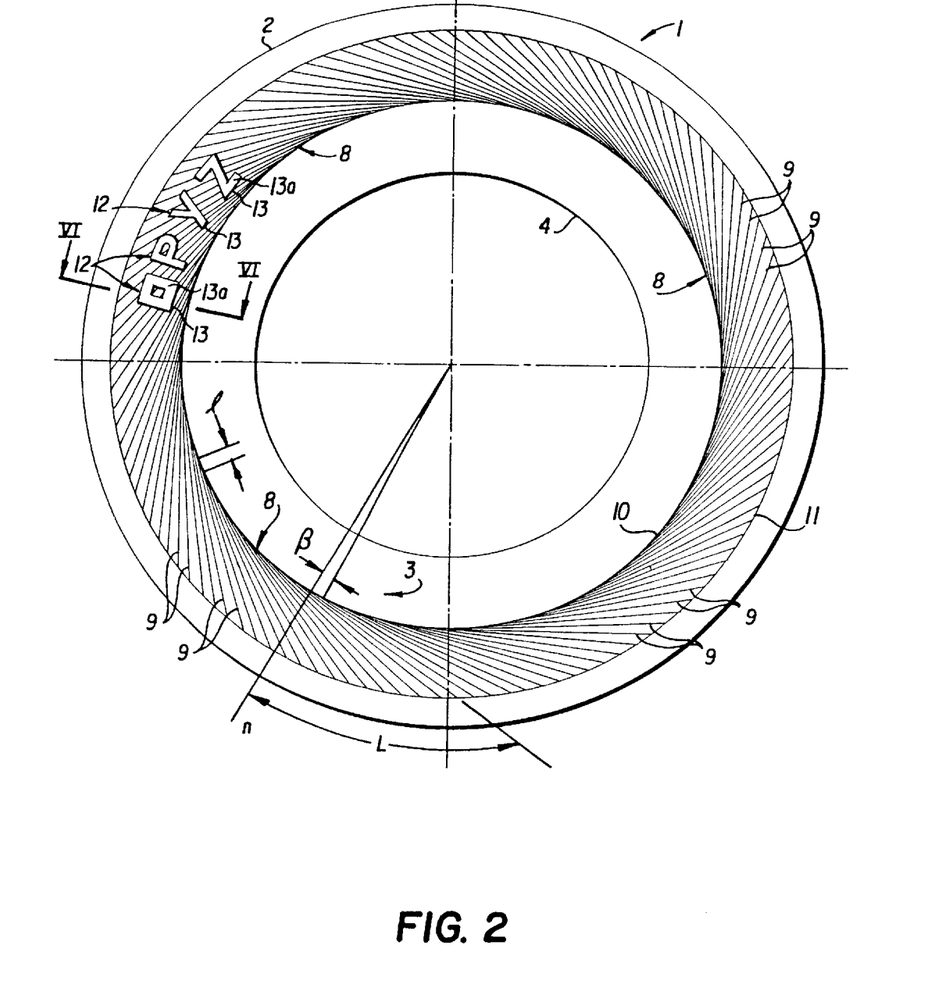
FIG. 2 is a diagrammatic side view of one embodiment of the tire in accordance with the invention.
Figure 3:
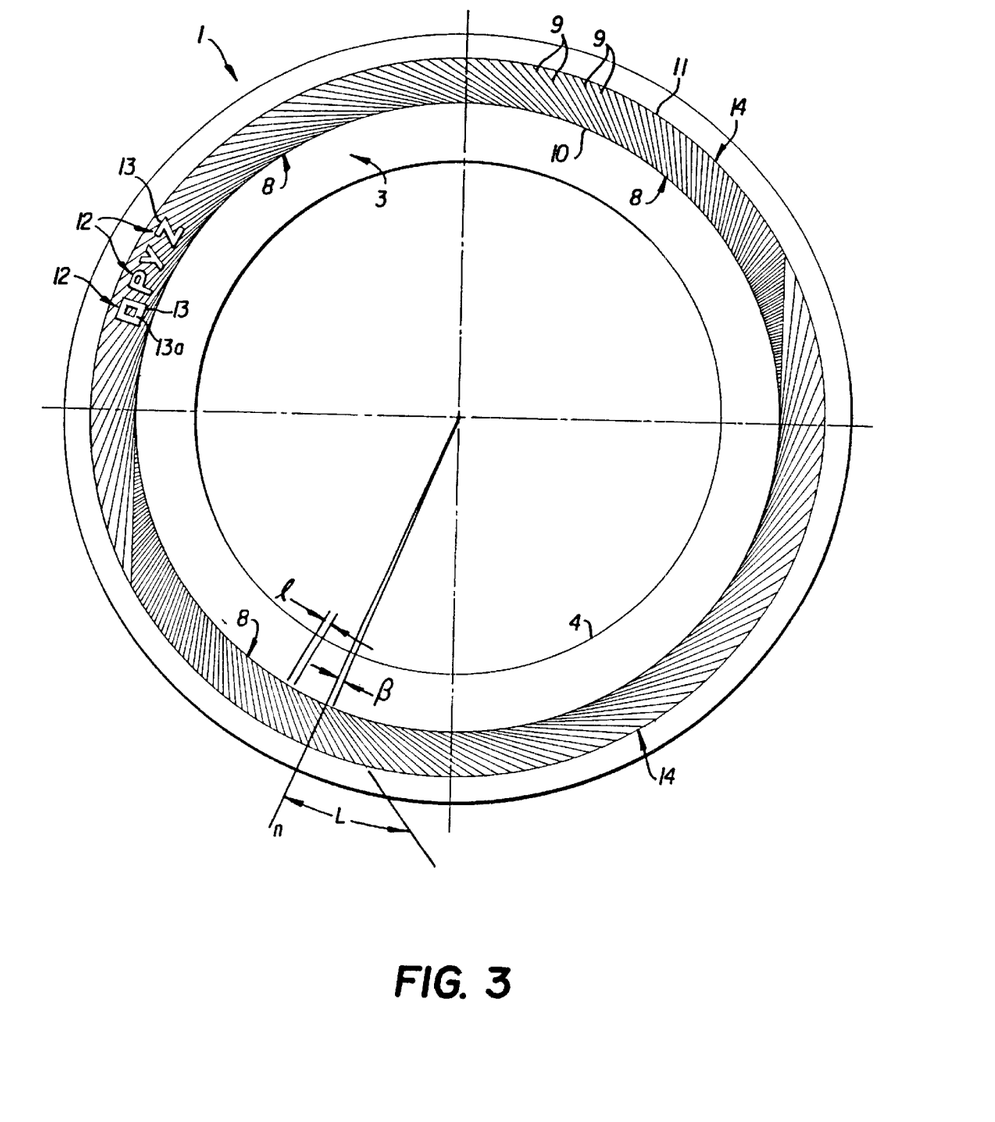
FIGS. 3, 4 and 5 are diagrammatic side views of further embodiments of the tire of the invention.
Figure 4:
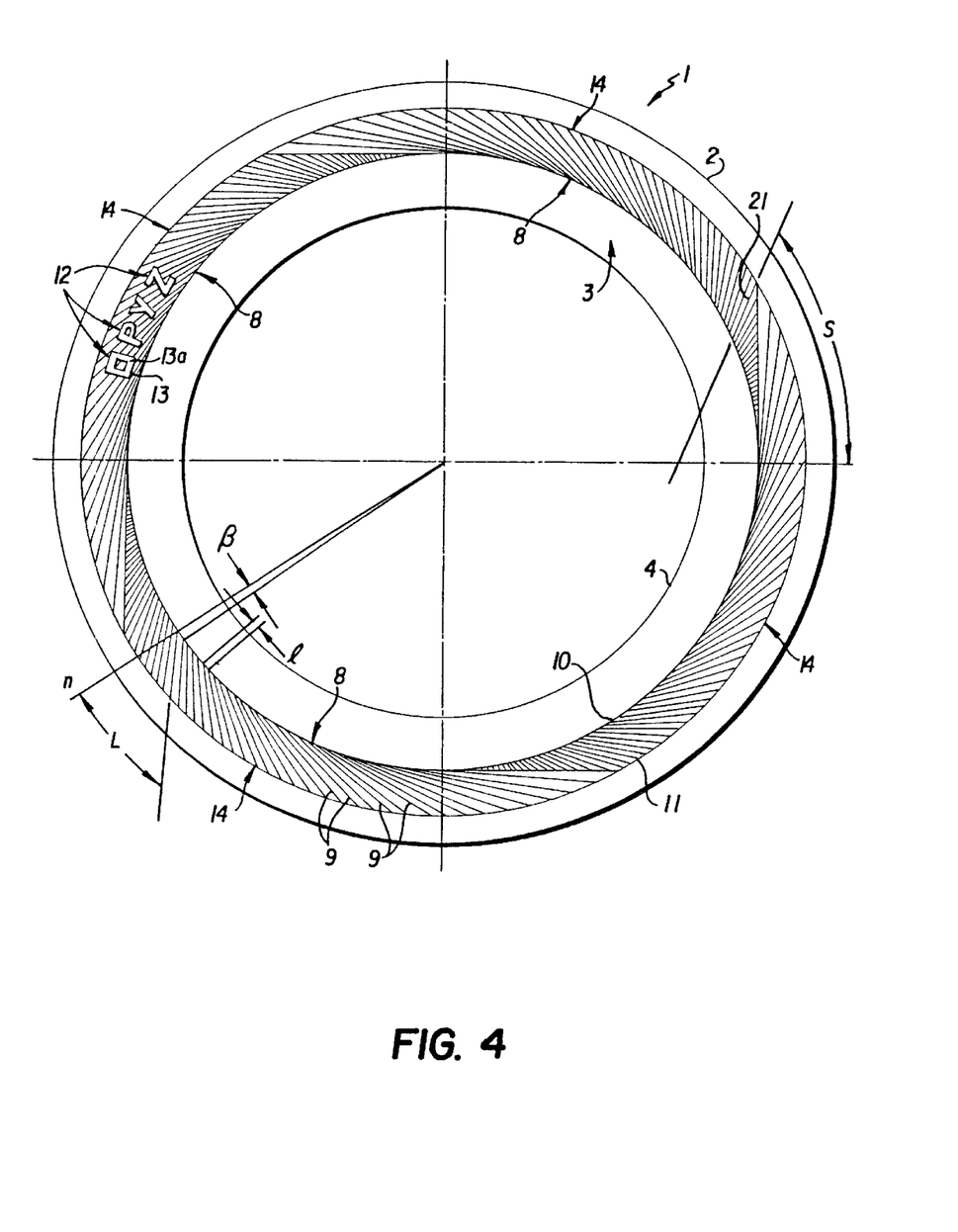

In greater detail, referring to FIGS. 2, 3 and 4, the annular strip 8 has ribs 9 extending from the inner peripheral edge 10 to the outer peripheral edge 11. Each of these ribs defines a predetermined angle of inclination "α" with respect to a radial straight line "n" issuing from the inner peripheral edge 10 at the intersecting point between this inner peripheral edge and the rib itself. In addition, each rib 9 defines with the adjacent rib, an arc "l" of predetermined length on the inner peripheral edge 10. This arc "l" then subtends a corresponding central angle denoted "β" in the accompanying drawings.

In greater detail, in the embodiment shown in FIG. 2, the angle of inclination "α" in particular generally takes a value included between 60° and 90° and preferably not higher than 85°. In the same embodiment the arc "l" and consequently the corresponding central angle "β" are identical for all pairs of adjacent ribs 9. According to a preferred choice, the arc "l" has a value ranging between 0.8 mm and 5 mm. As regards the central angle "β", the opening thereof is preferably included between 0.0178° and 1.350°. It will be clear that the values of arc "l" and angle "β" establish the density of said ribs on the tire sidewall.

The embodiments shown in FIGS. 3 and 4, provide for the annular strip 8 to be divided into a plurality of sectors of an annulus of the same angular amplitude.

In particular, FIG. 3 shows a tire 1 the annular strip 8 of which has two sectors of an annulus 14, whereas FIG. 4 shows a tire 1 the annular strip 8 of which is divided into four sectors 14.

Along the circumferential extension of each of said sectors, the angle of inclination "α" of said ribs 9 has a gradually increasing value and correspondingly a gradual increase of the arc "l" and the respective central angle "β" occurs.

More particularly, referring to the accompanying figures, traveling over each of said sectors 14 of the annular strip 8 in a counterclockwise direction, it is noticed that the angle of inclination "α" rises from a start value preferably equal to 0° to which a rib 9 oriented in a substantially radial direction corresponds, to a final value preferably equal to 90°, to which a rib directed tangentially to the inner peripheral edge 10 corresponds.

In each of said sectors 14 as the angle of inclination "α" gradually increases from 0° to 90°, a gradual increasing of the arc "l" occurs from a start value equal to 0.8 mm to a final value equal to 5 mm, as well as a gradual increase of the central angle "β" from a start value of 0.0178° to a final value of 1.350°.

The above has the purpose of avoiding the increases or reductions in density between contiguous ribs which would arise by effect of the variation of inclination in the ribs while keeping the value of the central angle "β" constant.

It is apparent from FIGS. 3 and 4 that in each sector 14 there is an interference area between the substantially radial ribs to be formed at the beginning of the sector and those substantially tangent to the inner peripheral edge coming from the contiguous sector.

The preferential solution for these areas is the one shown in said FIGS. 3 and 4, consisting in leaving the tangential ribs while eliminating the radial ones, so that (FIG. 4) the first rib 21, completely extended between the two peripheral edges, is inclined to the diameter passing by the end of sector 14 according to an angle "δ" of a value not lower than 60°.

Figure 5:
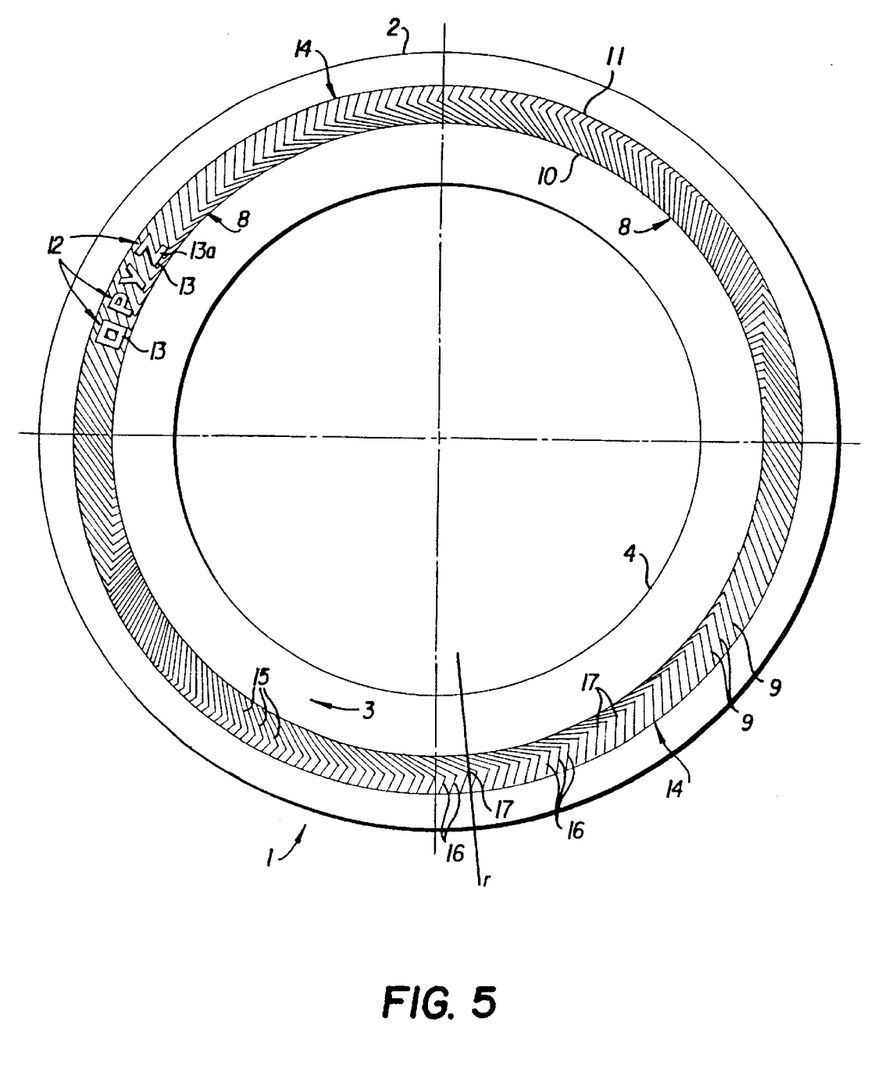

According to a further preferred embodiment shown in FIG. 5, each of the two sectors 14 into which the annular strip 8 is divided has a first series 15 and a second series 16 of ribs 9 extending from the inner peripheral edge 10 and the outer peripheral edge 11 of the annular strip 8, respectively. Preferentially, each rib 9 of the first series 15 intersects a corresponding rib 9 of the second series 16 defining a respective point of mutual break 17. In accordance with the preferred embodiment shown, each rib 9 of the first series 15 is inclined in the opposite direction to the corresponding rib 9 of the second series 16 with respect to a radial direction "r" passing by the respective point of mutual break 17 of the two ribs 9. In addition, the points of mutual break 17 of the different ribs 9 of each sector 14 are aligned according to a spiral-shaped line extending from the inner peripheral edge 10 to the outer peripheral edge 11 of the annular strip 8.

From the foregoing explanation several other embodiments of said annular strip can be easily drawn which are not herein show. There are, for example, at least two further versions according to which:

(a) the annular strip 8 is provided with two series of opposite ribs forming on said strip a knurling consisting of the intersecting ribs, and (b) the annular strip 8 is divided into two coaxial circular portions each provided with its own rib type according to the versions previously depicted.

In accordance with a further aspect of the present invention, the annular strip 8 on which said ribs 9 extend is formed on the corresponding tire sidewall in the form of a surface hollow of predetermined depth "p" relative to an overall general contour of the sidewall 3 as shown in FIG. 6. In a novel manner, the ribs 9 axially projecting from the annular strip 8 have a height "h" lower that the depth "p" of said surface hollow. However, the height "h" of the ribs 9 is not lower than half the depth "p" of said surface hollow.

In a new manner and in accordance with the present invention, any informative inscriptions 12 reproduced at the annular strip 8 are defined by a plurality of projections 19 emerging from said annular strip 8 according to a height "H" greater than the height "h" of the ribs and preferentially greater than the depth Dips of the surface hollow. Still by way of example, in the previously cited tire the depth "p" of the surface hollow is 0.45 mm, the rib height "h" is 0.35 mm and the height "H" of projections 19 is 0.80 mm.

The invention achieves important advantages.

Firstly, the rib assembly reflects the incident light on the sidewall thereby creating a diffuse luminosity in two diametrically opposite circular sectors of important width so as to make the various inscriptions present therein much more readable (the readability being due to the above reason), including those inscriptions that have been printed on the sidewall surface portion externally of said annular strip.

Secondly, as it has been already pointed out, the annular strip 8 provided with ribs 9 defines a surface particularly adapted to receive inscriptions 12 or information signs. In fact, the characters 13 of the inscriptions 12 have a substantially smooth outer surface 13a reflecting the incident light beams in a different manner than the surface of the annular strip 8 provided with ribs 9, with a very marked contrast effect.

Consequently, the character surface 13a has a substantially differentiated luminosity, that is a discontinuity in the light tone with respect to the surface of the annular strip 8. This discontinuity greatly improves the degree of readability of the informative inscriptions 12 under any read angle.

The above described effect is also emphasized by the fact that the ribs 9 and projections 19 defining the individual characters 13 of the inscriptions 12 axially project from the annular strip 8 according to mutually differentiated heights "h" and "H".

As to the arrangement of said inscriptions, they can be disposed according to a rectilinear configuration, not shown, optionally parallel to a rib and lie on the rib itself, or be oriented according to a direction inclined to all ribs present in the inscription area.

The inscriptions may also be disposed, in accordance with the traditional art shown, so as to form an arc of a circumference coaxial with the tire sidewall.

It is also to be pointed out that the presence on the sidewall 3 of an annular strip provided with ribs 9 in accordance with the present invention involves an important simplification in tire manufacture, referring particularly to the tire vulcanization step carried out in a corresponding mold.

In fact, these ribs define a plurality of venting channels disposed mutually in side by side relation and homogeneously distributed on the mold surface which are capable of radially conveying the air trapped between the tire sidewall and the mold cheek towards the bead 4 and buttress 3a areas, where said air can be easily discharged due to the approaching between the different metal parts of the mold. Therefore, by virtue of the present invention the usual discharge holes present on the mold cheeks can be eliminated thereby avoiding the formation of vulcanization stems. As a result, the already mentioned finishing operation of the vulcanized tire sidewalls is not required any longer.

Obviously a person skilled in the art will conceive many modifications and variations without departing from the scope of the present invention as defined in the appended claims.

What is claimed is:

1. A tire for operating use on motor-vehicle wheels, comprising:
    a pair of beads each of which is defined at an inner circumferential edge of the tire;
    a pair of sidewalls, each of which is in the form of an annulus extending in a radial direction away from one of said beads;
    a tread band of substantially cylindrical conformation with opposite peripheral edges joined to the sidewalls at respective buttress areas, an outer surface of at least one of said sidewalls having an annular strip, formed on the sidewall in the form of a surface hollow of predetermined depth ("p") relative to an overall general contour of the sidewall, the radial extension of which is defined between an inner peripheral edge disposed in the area between an associated bead and a maximum axial width circumferential line of the tire and an outer peripheral edge substantially coincident with the peripheral edge of the tread band at a corresponding buttress area;
    a plurality of substantially rectilinear ribs being formed on said annular strip and disposed consecutively in side by side relation, said plurality of ribs being circumferentially distributed and each rib of said plurality of ribs being disposed within said annular strip,
    said ribs of said plurality of ribs having a height ("h") less than the depth ("p") of said surface hollow;
    wherein the annular strip has a first series of ribs and a second series of ribs extending from the inner peripheral edge and outer, peripheral edge respectively, each rib of the first series intersecting a corresponding rib of the second series at a respective point of mutual break.

2. A tire according to claim 1 in which said annular strip is divided into coaxial annular portions, a first said coaxial annular portion comprising said first series of ribs and a second said coaxial annular portion comprising said second series of ribs.

3. A tire for operating use on motor-vehicle wheels, comprising:
    a pair of beads each of which is defined at an inner circumferential edge of the tire;
    a pair of sidewalls, each of which is in the form of an annulus extending in a radial direction away from one of said beads;
    a tread band of substantially cylindrical conformation with opposite peripheral edges joined to the sidewalls at respective buttress areas, an outer surface of at least one of said sidewalls having an annular strip, formed on the sidewall in the form of a surface hollow of predetermined depth ("p") relative to an overall general contour of the sidewall, the radial extension of which is defined between an inner peripheral edge disposed in the area between an associated bead and a maximum axial width circumferential line of the tire and an outer peripheral edge substantially coincident with the peripheral edge of the tread band at a corresponding buttress area;
    a plurality of substantially rectilinear ribs being formed on said annular strip and disposed consecutively in side by side relation, said plurality of ribs being circumferentially distributed and each rib of said plurality of ribs being disposed within said annular strip,
    said ribs of said plurality of ribs having a height ("h") less than the depth ("p") of said surface hollow;
    wherein the annular strip has a predetermined number of sectors of an annulus of the same angular extension, each of said sectors having a first series of ribs and a second series of ribs extending from the inner peripheral edge and outer peripheral edge respectively, each rib of the first series intersecting a corresponding rib of the second series at a respective point of mutual break.

4. A tire according to claim 3, further comprising informative inscriptions formed in a unitary manner on the annular strip.

5. A tire according to claim 3, in which each rib of the first series is inclined in an opposite direction to that of the corresponding rib of the second series with respect to a radial direction ("r") passing through said respective point of mutual break.

6. A tire according to claim 3, in which the annular strip is divided into two sectors of an angular extension substantially equal to 180°.

7. A tire according to claim 3, in which said points of mutual break are consecutively aligned along a spiral-shaped line extending from the inner peripheral edge to the outer peripheral edge.

8. A tire for operating use on motor-vehicle wheels, comprising:

a pair of beads each of which is defined at an inner circumferential edge of the tire;

a pair of sidewalls, each of which is in the form of an annulus extending in a radial direction away from one of said beads;

a tread band of substantially cylindrical conformation with opposite peripheral edges joined to the sidewalls at respective buttress areas, an outer surface of at least one of said sidewalls having an annular strip, formed on the sidewall in the form of a surface hollow of predetermined depth ("p") relative to an overall general contour of the sidewall, the radial extension of which is defined between an inner peripheral edge disposed in the area between an associated bead and a maximum axial width circumferential line of the tire and an outer peripheral edge substantially coincident with the peripheral edge of the tread band at a corresponding buttress area;

plurality of substantially rectilinear ribs formed on said annular strip and disposed consecutively in side by side relation, said plurality of ribs being circumferentially distributed and each rib of said plurality of ribs being disposed within said annular strip, said ribs of said plurality of ribs having a height ("h") less than the depth ("p") of said surface hollow;

informative inscriptions formed on said annular strip said inscriptions being formed as solid non-striped characters on the annular strip and defined by a plurality of projections having smooth surfaces, emerging from said annular strip with a height greater than that of said ribs, and the height of said projections being greater than the depth of said surface hollow, in which the annular strip has a predetermined number of sectors of an annulus of the same angular extension, each of said sectors having a first series of ribs and a second series of ribs extending from the inner peripheral edge and outer peripheral edge respectively, each rib of the first series intersecting a corresponding rib of the second series at a respective point of mutual break.

9. A tire according to claim 8, in which said annular strip is free of residual vulcanization stems.

10. A tire according to claim 8, in which said ribs have a height ("h") not less than half the depth ("p") of said surface hollow.

11. A tire according to claim 8, in which said ribs have a trapezoidal-shaped profile in cross-section.

12. A tire according to claim 8, in which each rib of the first series is inclined in an opposite direction to that of the corresponding rib of the second series with respect to a radial direction ("r") passing through said respective point of mutual break.

13. A tire according to claim 8, in which the annular strip is divided into two sectors of an angular extension substantially equal to 180°.

14. A tire according to claim 8, in which said points of mutual break are consecutively aligned along a spiral-shaped line extending from the inner peripheral edge to the outer peripheral edge.

15. A tire according to claim 8, in which the number of said ribs present on said annular strip is higher than 200.

16. A tire according to claim 8, in which at least one of said inscriptions is disposed on a straight line.

17. A tire according to claim 8, in which at least one of said inscriptions lies along one of said ribs.

* * * * *